US009742903B1

(12) United States Patent
Ferdman et al.

(10) Patent No.: US 9,742,903 B1
(45) Date of Patent: Aug. 22, 2017

(54) DETECTING NOTABLE EVENTS AND ANNOTATING MULTIMEDIA DATA BASED ON THE NOTABLE EVENTS

(71) Applicant: Verizon Patent and Licensing Inc., Arlington, VA (US)

(72) Inventors: Julian Ferdman, Brooklyn, NY (US); Kuo-Wei Tseng, Jersey City, NJ (US); Shawn Bramson, Montreal (CA); Margaret Barnes, Birmingham, AL (US); Jean-Charles Gasche, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/082,309

(22) Filed: Mar. 28, 2016

(51) Int. Cl.
| H04M 1/00 | (2006.01) |
| H04M 1/725 | (2006.01) |
| H04L 29/08 | (2006.01) |
| H04B 7/00 | (2006.01) |
| G06T 11/60 | (2006.01) |

(52) U.S. Cl.
CPC ........ *H04M 1/72569* (2013.01); *H04L 67/12* (2013.01); *H04L 67/22* (2013.01); *H04M 1/7253* (2013.01); *G06T 11/60* (2013.01)

(58) Field of Classification Search
CPC ... H04M 1/72527; H04M 1/7253; H04N 7/14

USPC ............................................. 455/556.1, 557
See application file for complete search history.

(56) References Cited

U.S. PATENT DOCUMENTS

2016/0191796 A1* 6/2016 Mate ................. H04N 5/23238
   348/39

OTHER PUBLICATIONS

Nigel Wynn, Strava: one of the first apps on Google Glass, Cyclingweekly, Dec. 18, 2013, 2 pages.*

(Continued)

*Primary Examiner* — Lee Nguyen

(57) ABSTRACT

A user device, such as a smart phone, may capture sensor data or interface with a wearable device, such as a smart watch, or another user device to capture sensor data related to the capture of multimedia content. The sensor data may relate to a user, other people, and/or an associated environment. The sensor data may be processed to detect notable events based on a sensor value having a value or being within a range of values associated with the notable event. When a notable event is detected, the multimedia content may be annotated or modified based on the notable event. For example, the multimedia content may be modified to identify the notable event and/or present sensor data captured in connection with the notable event. A user interface may be presented to enable a user to identify instances of notable events and exchange sensor data.

20 Claims, 13 Drawing Sheets

(56) References Cited

OTHER PUBLICATIONS http://www.engadget.com/2016/01/26/livestream-your-next-gopro-video-through-periscope/, first accessed/visited Mar. 11, 2016. [printed Apr. 7, 2017].
http://www.intel.com/content/www/us/en/wearables/wearable-soc.html, first accessed/visited Mar. 11, 2016. [printed Apr. 7, 2017].
https://getgraava.com/, first accessed/visited Mar. 11, 2016. [printed Apr. 7, 2017].
https://shop.soloshot.com/, first accessed/visited Mar. 11, 2016. [printed Apr. 7, 2017].
https://www.youtube.corn/watch?v=73wV6KIGm-A, first accessed/visited Mar. 11, 2016. [printed Apr. 7, 2017].
kck.st/Carv (https://www.kickstarter.com/projects/333155164/carv-the-worlds-first-wearable-that-helps-you-ski?ref=ksrsocial), first accessed/visited Mar. 11, 2016. [printed Apr. 7, 2017].

\* cited by examiner

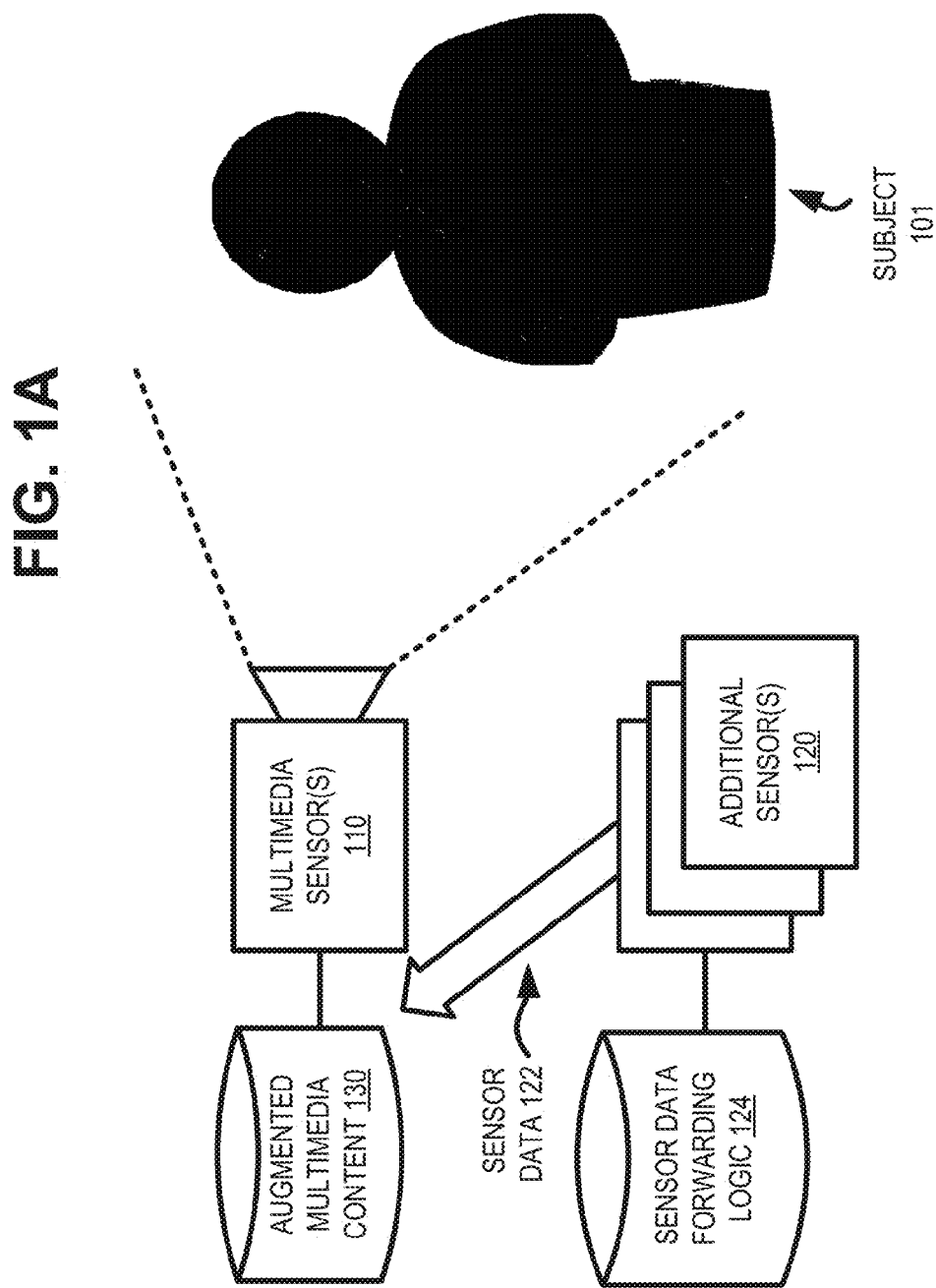

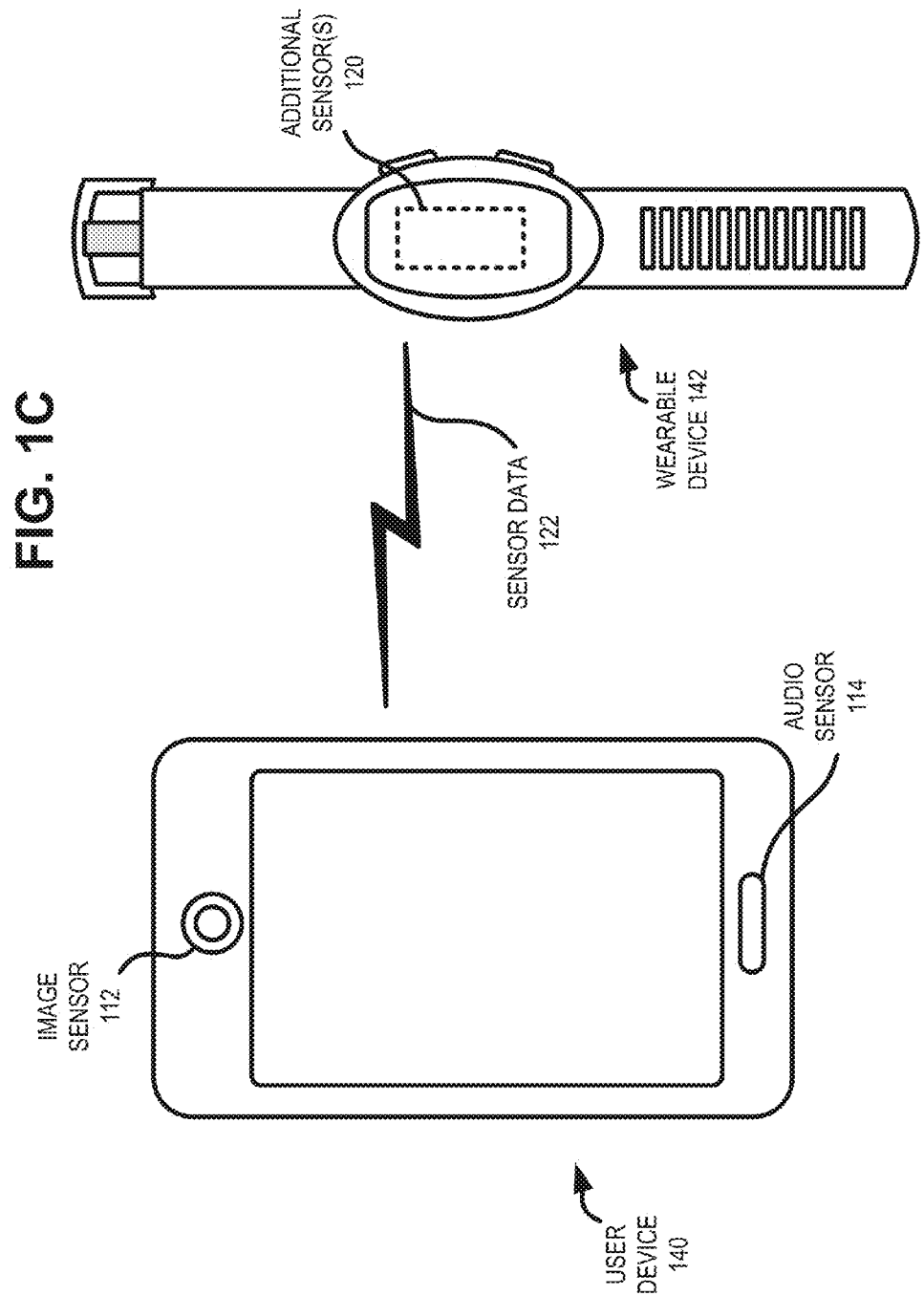

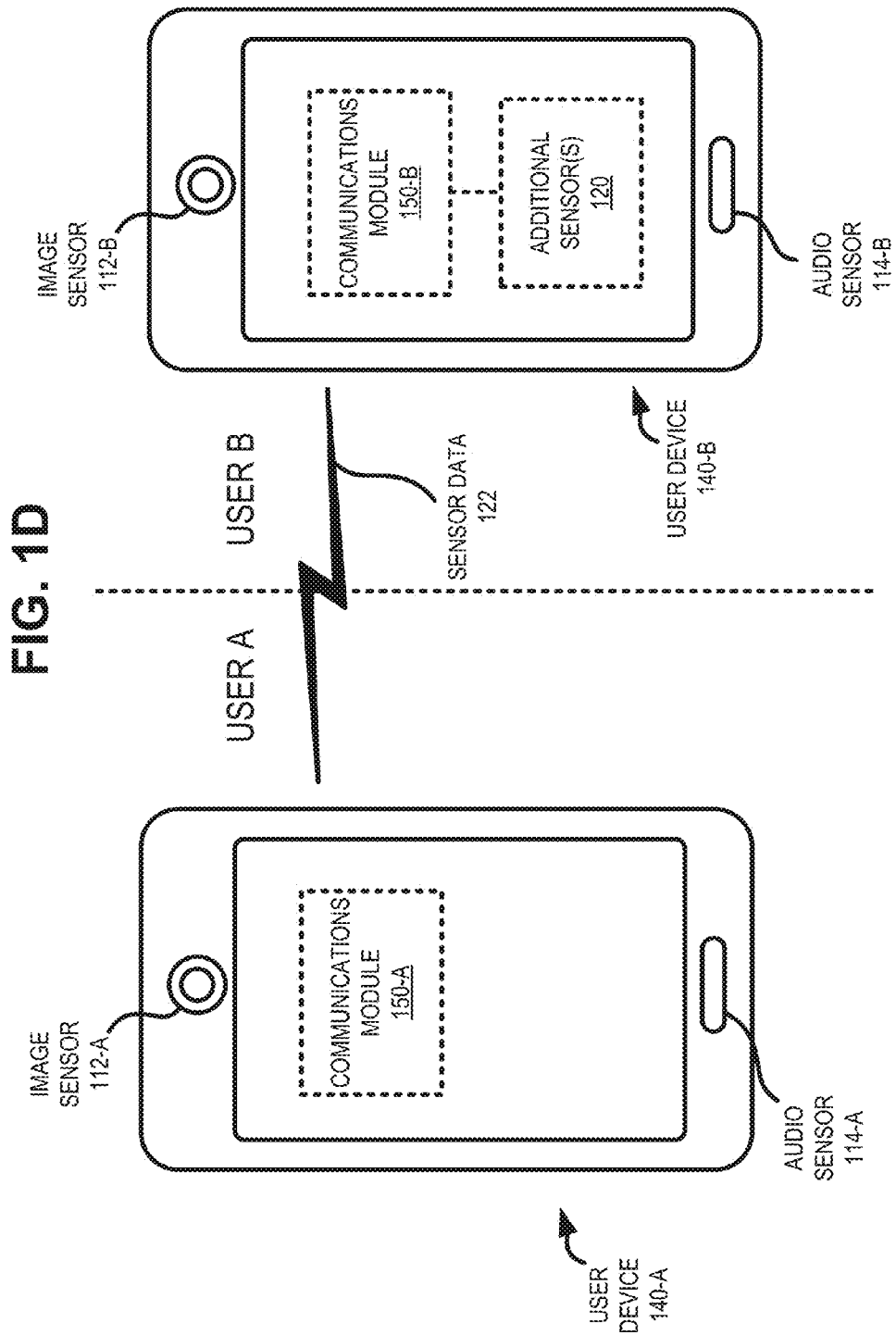

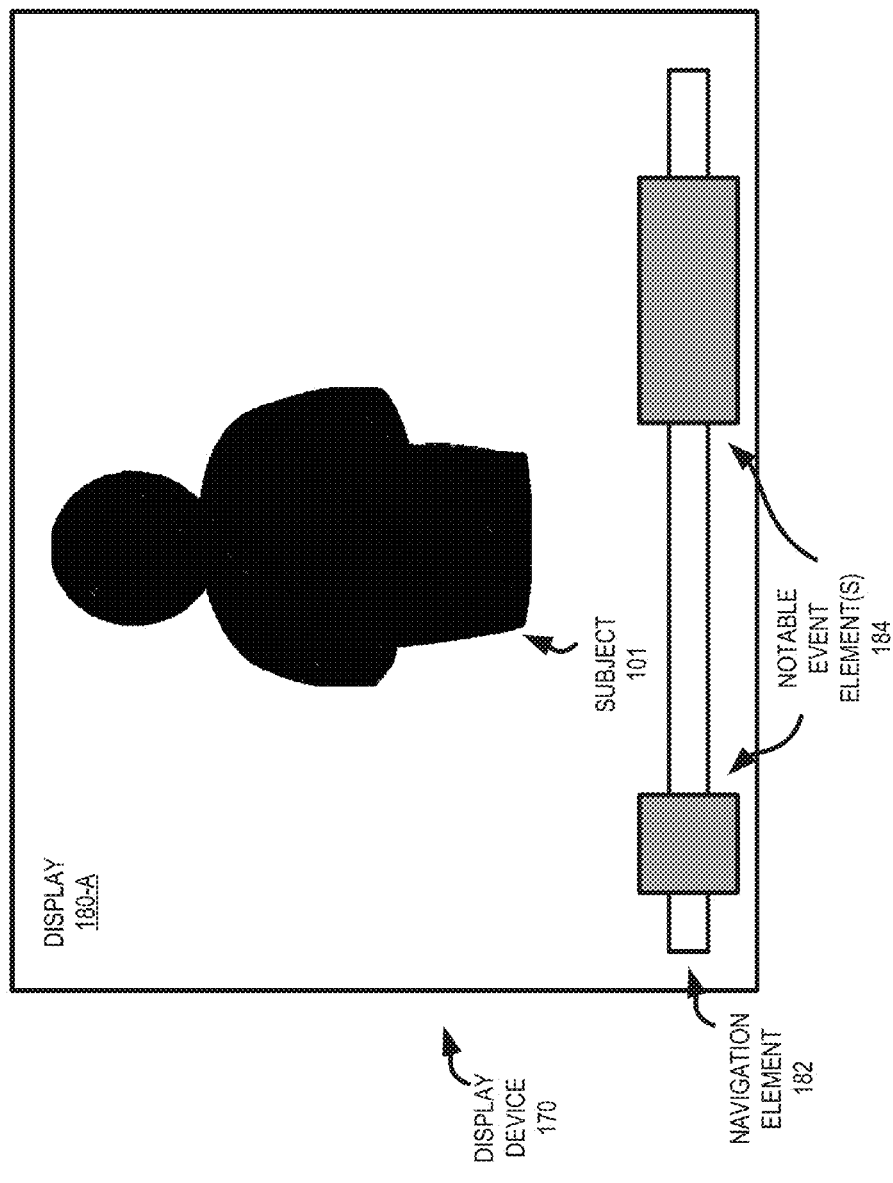

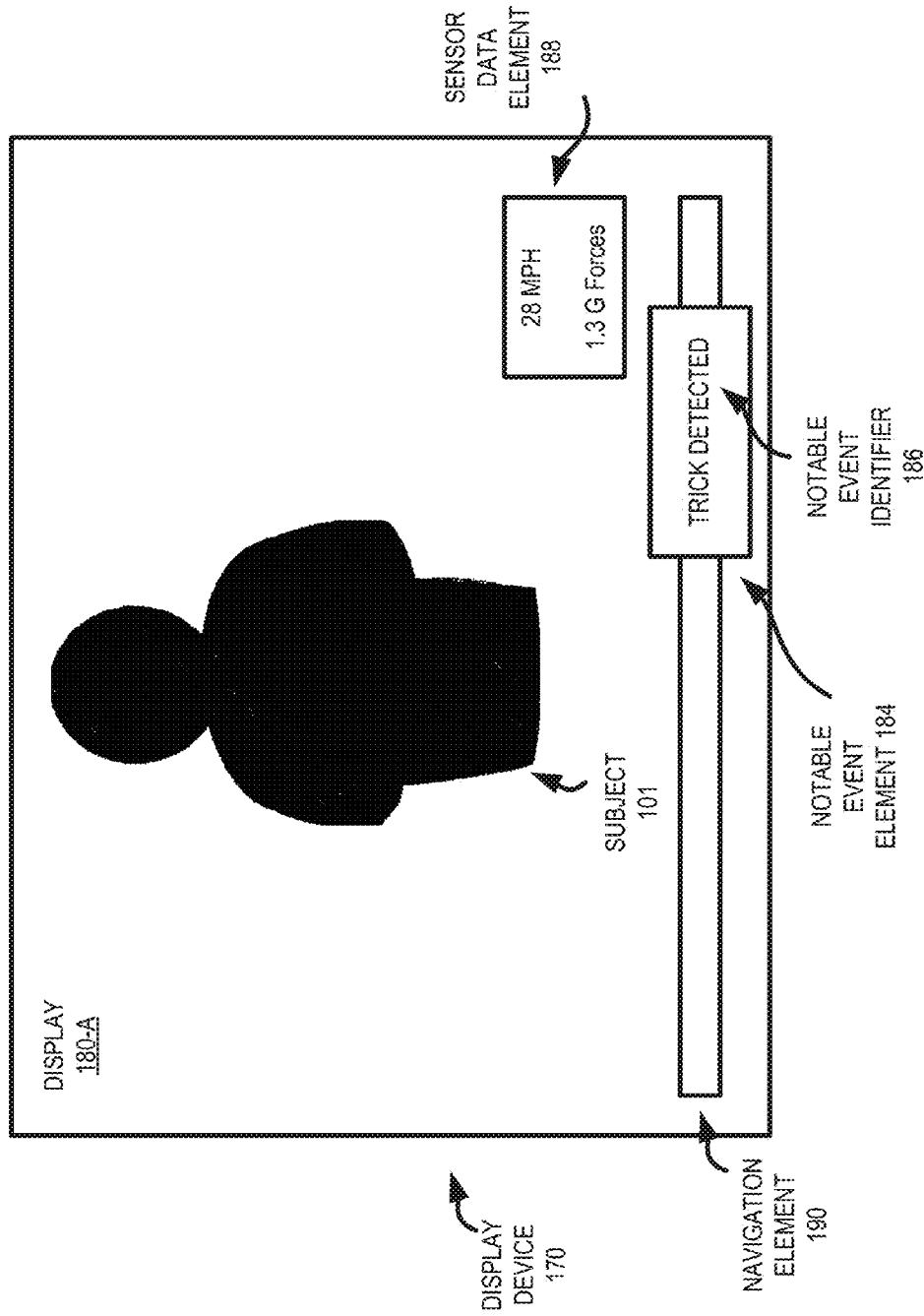

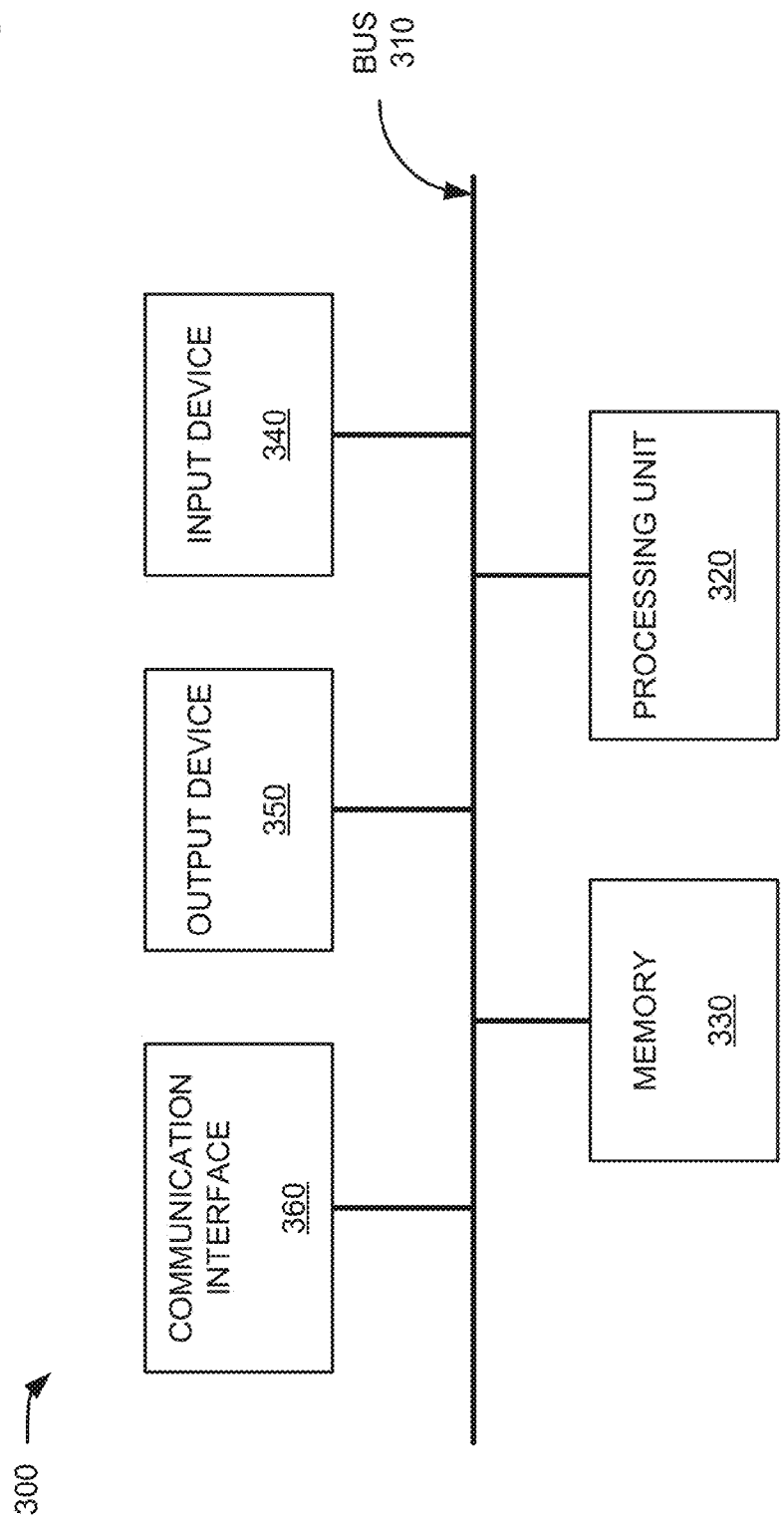

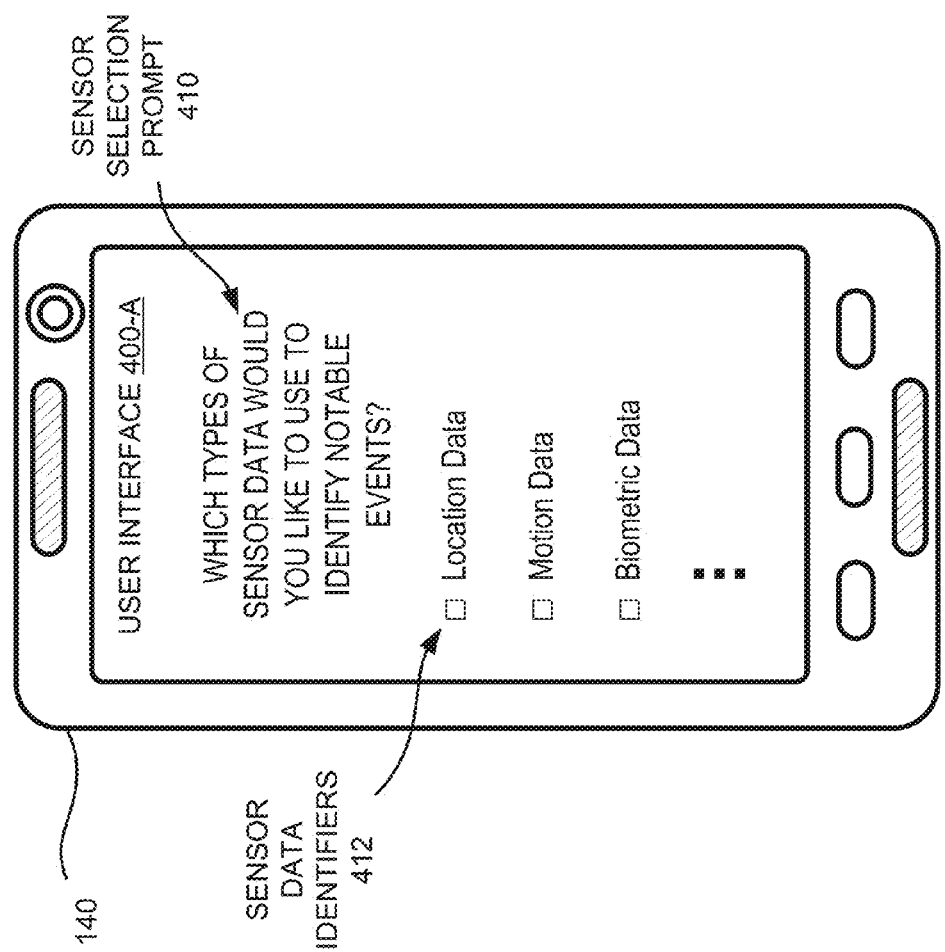

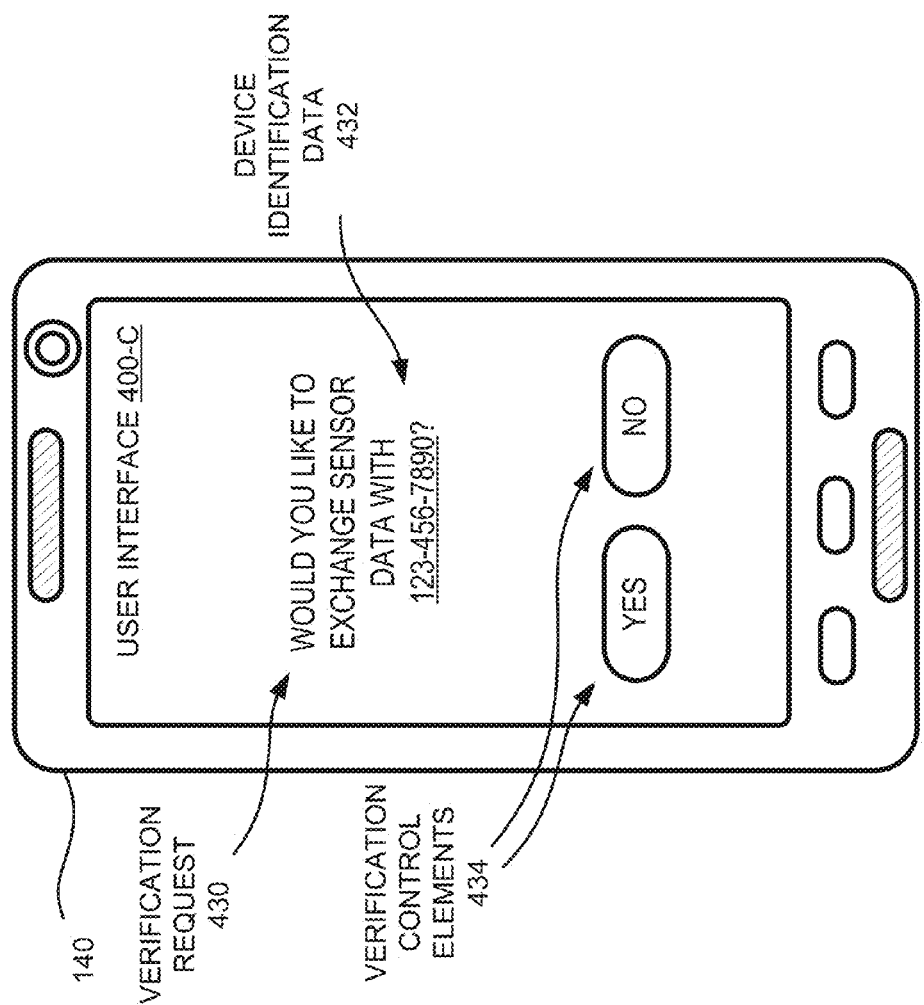

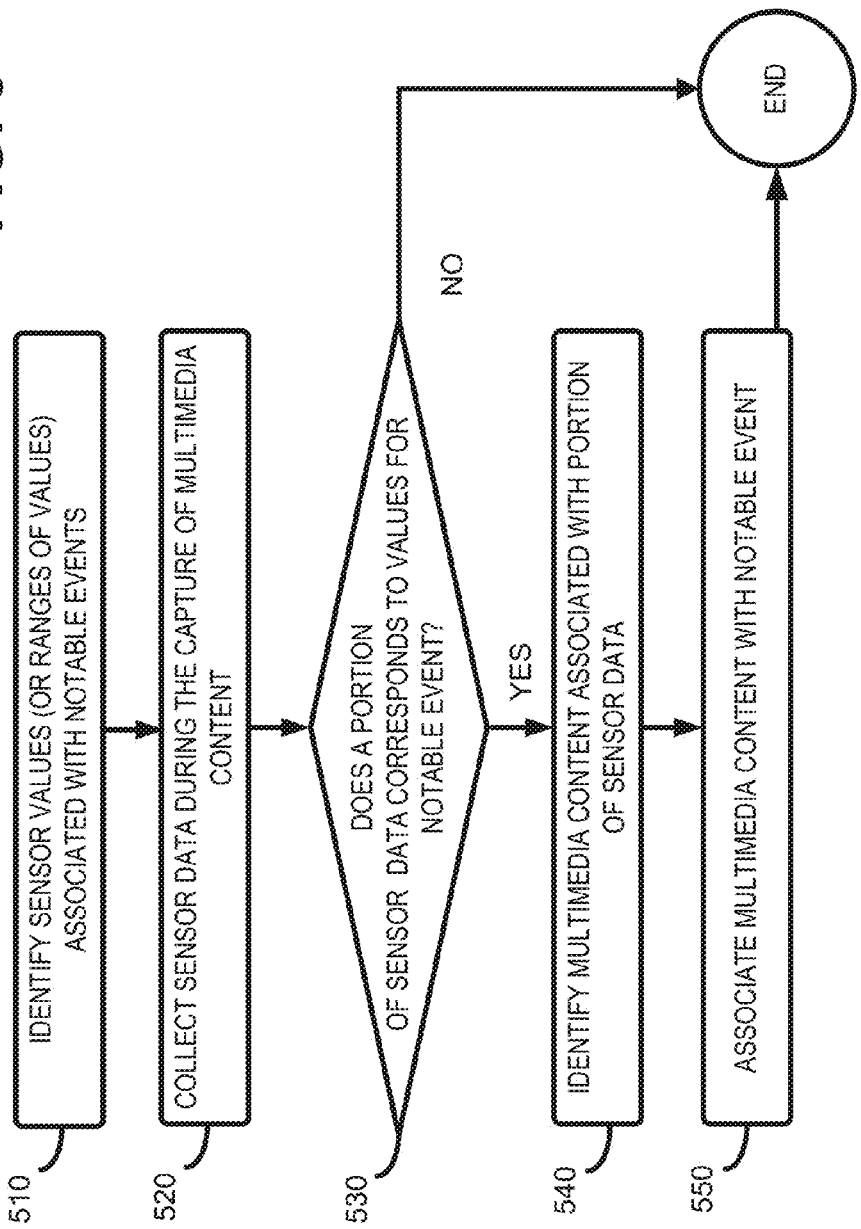

DETECTING NOTABLE EVENTS AND ANNOTATING MULTIMEDIA DATA BASED ON THE NOTABLE EVENTS

BACKGROUND INFORMATION

A mobile device, such as a smart phone, may include a camera and/or microphone to capture multimedia content. A mobile device may further include additional sensors to capture other types of data. The mobile device may be used with one or more other devices that provide additional functions and/or features that are not present on the mobile device itself. For example, the mobile device may be used with smart glasses that capture and/or present visual data to a user, headphones that capture and/or present audio data to a user, smart watches or fitness trackers that monitor activities of a user, etc.

BRIEF DESCRIPTION OF THE DRAWINGS

FIGS. 1A-1G are diagrams showing examples of the principles described herein;

FIG. 3 is a diagram illustrating exemplary components of a computing device that may be included in the environment of FIG. 2;

FIGS. 4A-4C show exemplary user interfaces that may be presented by a user device in the environment of FIG. 2; and FIG. 5 shows an exemplary process for detecting and identifying portions of multimedia content capturing notable events.

DETAILED DESCRIPTION OF PREFERRED EMBODIMENTS

Figure 1B:
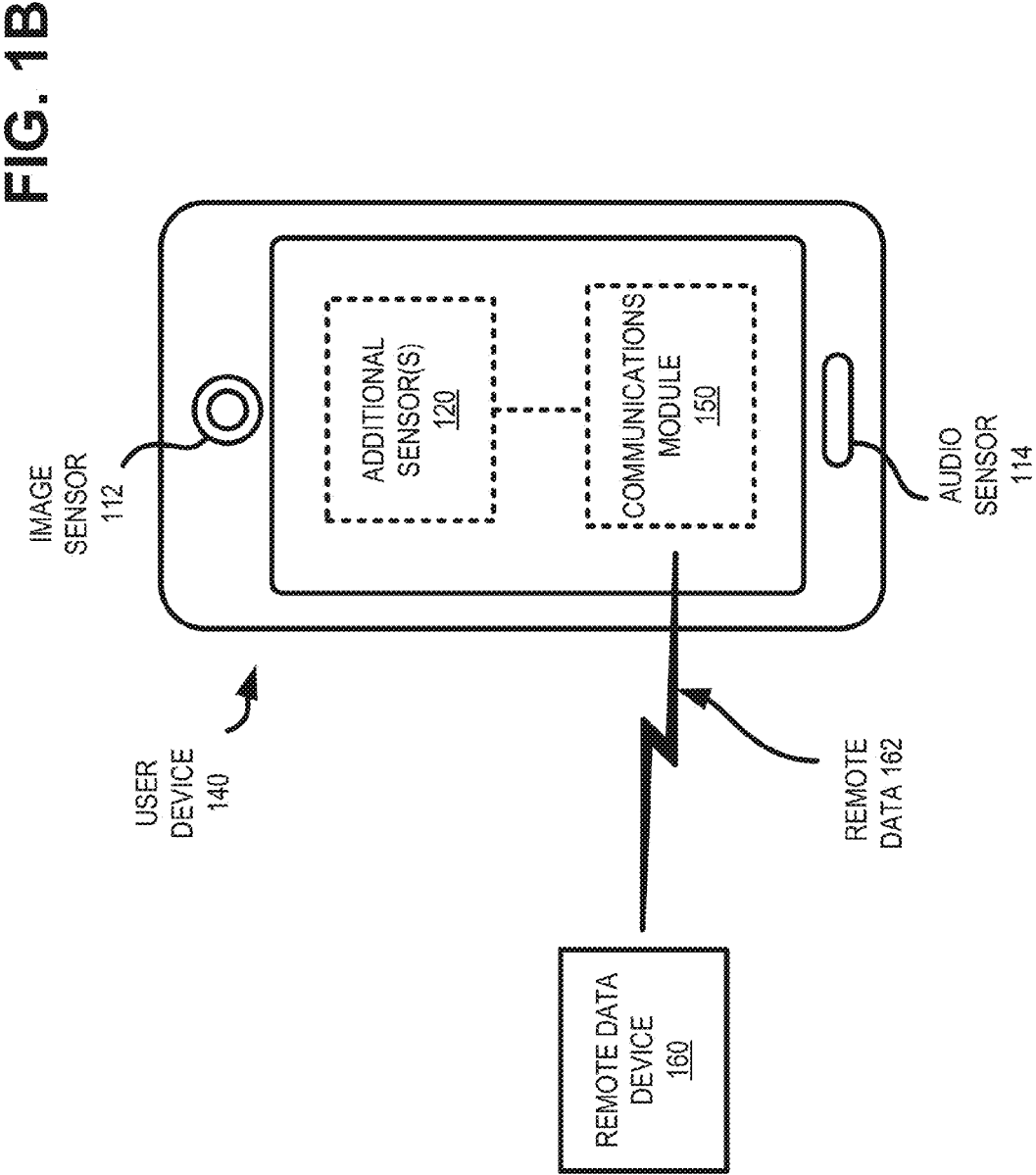

The following detailed description refers to the accompanying drawings. The same reference numbers in different drawings identify the same or similar elements.

In systems and methods described herein, a user device, such as a smart phone, may capture sensor data or interface with a wearable device, such as a smart watch, or another user device to capture sensor data related to the capture of multimedia content. The sensor data may relate to a user, other people, and/or an associated environment. The sensor data may be processed to detect notable events. For example, a notable event may be detected based on a sensor value (e.g., velocity, acceleration, heart rate, temperature, ambient noise levels, etc.) having a value or being within a range of values associated with the notable event. When a notable event is detected, the multimedia content may be annotated or otherwise modified based on the notable event. For example, the multimedia content may be modified to identify the notable event and/or present sensor data captured in connection with the notable event. In certain implementations, a user interface may be presented to enable a user to identify instances of notable events, exchange data, etc.

FIGS. 1A-1G are diagrams showing examples of the principles described herein. In the example shown in FIG. 1A, multimedia sensor(s) 110 may capture multimedia data (e.g., image, audio, and/or video data) regarding a subject 101. One or more additional sensors 120 may collect other sensor data 122 regarding subject 101, a third party (e.g., a user of multimedia sensor 110 and/or additional sensors 120) and/or a surrounding environment. Sensor data forwarding logic 124 may determine whether sensor data 122 is associated with a possible occurrence of a notable event. For example, sensor data forwarding logic 124 may identify ranges of sensor values associated with a notable event, and may determine whether sensor data 122 falls within the identified ranges for the notable event. If sensor data 122 is indicates conditions associated with a notable event, relevant portions of sensor data 122 may be stored with data collected by multimedia sensor 110 as augmented multimedia content 130. For example, augmented multimedia content 130 may store a portion of sensor data 122 associated with a notable event (e.g., the portion of sensor data 122 within a certain range of values and/or conforming to a selection criteria) in connection with corresponding multimedia content (e.g., content associated with a matching time signature). As described in greater detail below with respect to FIGS. 1F and 1G, the augmented multimedia content 130 may be presented to identify possible notable events. Furthermore, since only segments of sensor data 122 are included in augmented multimedia content 130 (i.e., portions associated with possible notable events), augmented multimedia content 130 requires only limited storage and processing resources in comparison to storing all readings collected by additional sensors 120.

FIG. 1B depicts an example in which a single user device 140 includes multimedia sensors 110 and additional sensors 120. User device 140 may correspond to, for example, a portable communication device (e.g., a mobile phone, a smart phone, a phablet device, a global positioning system (GPS) device, and/or another type of wireless device); a laptop (e.g., with a wireless air card), tablet, or another type of portable computer; a media playing device; a portable gaming system; a digital camera and/or any other type of mobile computer device with communication and output capabilities. In the example shown in FIG. 1B, user device 140 may include an image sensor 112, such as camera, to collect optical data regarding subject 101, and an audio sensor 114, such as a microphone, to collect audio data regarding subject 101.

In one implementation, additional sensor 120 may include a motion sensor, such as an accelerometer, gyroscope, etc., that determines information regarding a movement of user device 140. Additionally, the motion sensor may detect a position and/or motion of an object or a person (e.g., a user of user device 140) holding and/or otherwise monitored by user device 140. User device 140 may store movement patterns associated with a movement of user device 140 and/or an associated user during a notable event. For example, a movement pattern may identify one or more motion directions, motion velocities, motion durations, etc., associated with a movement during the notable event. User device 140 may compare a motion detected by additional sensor 120 to the movement patterns for the notable event, and user device 140 may determine that the notable event occurred when the detected motion corresponds to the motion pattern for the notable event.

In one implementation, additional sensors 120 capture other types of information regarding a user or a surrounding environment at the time that multimedia content is captured by image sensor 112 and/or audio sensor 114. For example, user device 140 may include a location sensor, such as a sensor to receive a global positioning system (GPS) or other location data, or a component to dynamically determine a location of user device 140 (e.g., by processing and triangulating data/communication signals received from one or more base stations). Furthermore, changes in the location of user device 140 may be used to determine other attributes regarding user device 140 or an associated user, such as a velocity and/or direction traveled by user device 140 during a given time period.

In another example, user device 140 may process multimedia content captured by image sensor 112 and/or audio sensor 114 to determine further information regarding conditions present when the multimedia content was captured. For example, user device 140 may evaluate captured image data to determine ambient conditions, such as light levels. User device 140 may further evaluate captured image data to determine information regarding subject 101, such as to determine whether subject 101 is looking in the direction of user device 140. In another example, user device 140 may perform facial analysis of image data associated with subject 101 and determine whether subject 101 is known (e.g., matches an image of a contact associated with user device 140). Additionally or alternatively, user device 140 may determine whether subject 101 is smiling or displaying another facial expression typically associated with a given notable event. In yet another example, user device 140 may analyze audio data collected by audio sensor 114 to determine whether the audio data corresponds to a sound pattern (e.g., volume, tone, etc.) associated with a notable event. Additionally or alternatively, user device 140 may perform a speech-to-text analysis of the captured audio data to identify a phrase spoken by subject 101 or another person, and may determine whether the phrase is associated with a notable event (e.g., saying "Happy Birthday").

As shown in FIG. 1B, user device 140 may further include a communications module 150 to access a remote data device 160 to receive remote data 162. For example, communications module 150 may enable user device 140 to access a data network, such as the Internet, through a wired or wireless connection. Remote data 162 may identify environment conditions such as weather, light, sound conditions, names of users associated with other mobile devices at a geographic location associated with user device 140, a business located at the geographic location, etc. Additionally or alternatively, remote data 162 may include contact information identifying another user device 140 that may provide relevant sensor data 122 (e.g., another user device 140 located proximate to user device 140 capturing multimedia data). The contact information may identify another user and/or information associated with the other user device 140 (e.g., a telephone number, network address, a media access control (MAC) address, etc.). In another implementation, remote data 162 may identify criteria for selecting sensor data 122, such as data identifying notable events and/or sensor data ranges associated with the notable events.

FIG. 1C depicts another example in which user device 140 includes multimedia sensors 110 (such as image sensor 112 and/or audio sensor 114) and receives sensor data 122 collected by additional sensor(s) 120 included in a wearable device 142 associated with a same user. Wearable device 142 may include, for example, a smart watch, smart glasses, a fitness tracker, or other device that may be worn or otherwise coupled to a user. Additional sensor 120 for wearable device 142 may include a motion sensor, such as an accelerometer, gyroscope, etc. that identifies a movement of wearable device 142 and/or an associated user. In another example, additional sensor 120 included in wearable device 142 may collect biometric (health-related) data such as a heart rate, a heart rhythm, a body temperature, blood oxygen levels, etc. associated with a user wearing wearable device 142. For example, additional sensor 120 may collect biometric data regarding subject 101, a user capturing multimedia data (e.g., a camera operator), and/or a third-party spectator.

Additional sensor 120 included in wearable device 142 may also collect multimedia data (e.g., image, sound, or video data) separately from user device 140.

In the example shown in FIG. 1C, user device 140 and wearable device 142 may be coupled via a physical connection, such as a universal serial bus (USB) or a Lightning Wire® cable. Additionally or alternatively, user device 140 and wearable device 142 may include a wireless networking interface, such as a Bluetooth® wireless interface, a radio-frequency identification (RFID) interface, a near-field communications (NFC) wireless interface, infra-red (IR) communications interface, and/or any other type of interface to exchanges data within a short distance.

FIG. 1D depicts an example in which a user device 140-A (associated with User A) includes multimedia sensors 110 (such as image sensor 112-A and/or audio sensor 114-A) and receives sensor data 122 collected by another user device 140-B (associated with User B) that includes additional sensor(s) 120. As shown in FIG. 1D, the other user device 140-B may also include multimedia sensors 110, such as image sensor 112-B and/or audio sensor 114-B.

As shown in FIG. 1D, user devices 140-A and 140-B may include, respectively, communications modules 150-A and 150-B to enable the exchange of sensor data 122. For example, user devices 140-A and 140-B may be coupled through a physical connection or wire and/or may be connected through a wireless networking interface.

Figure 1E:
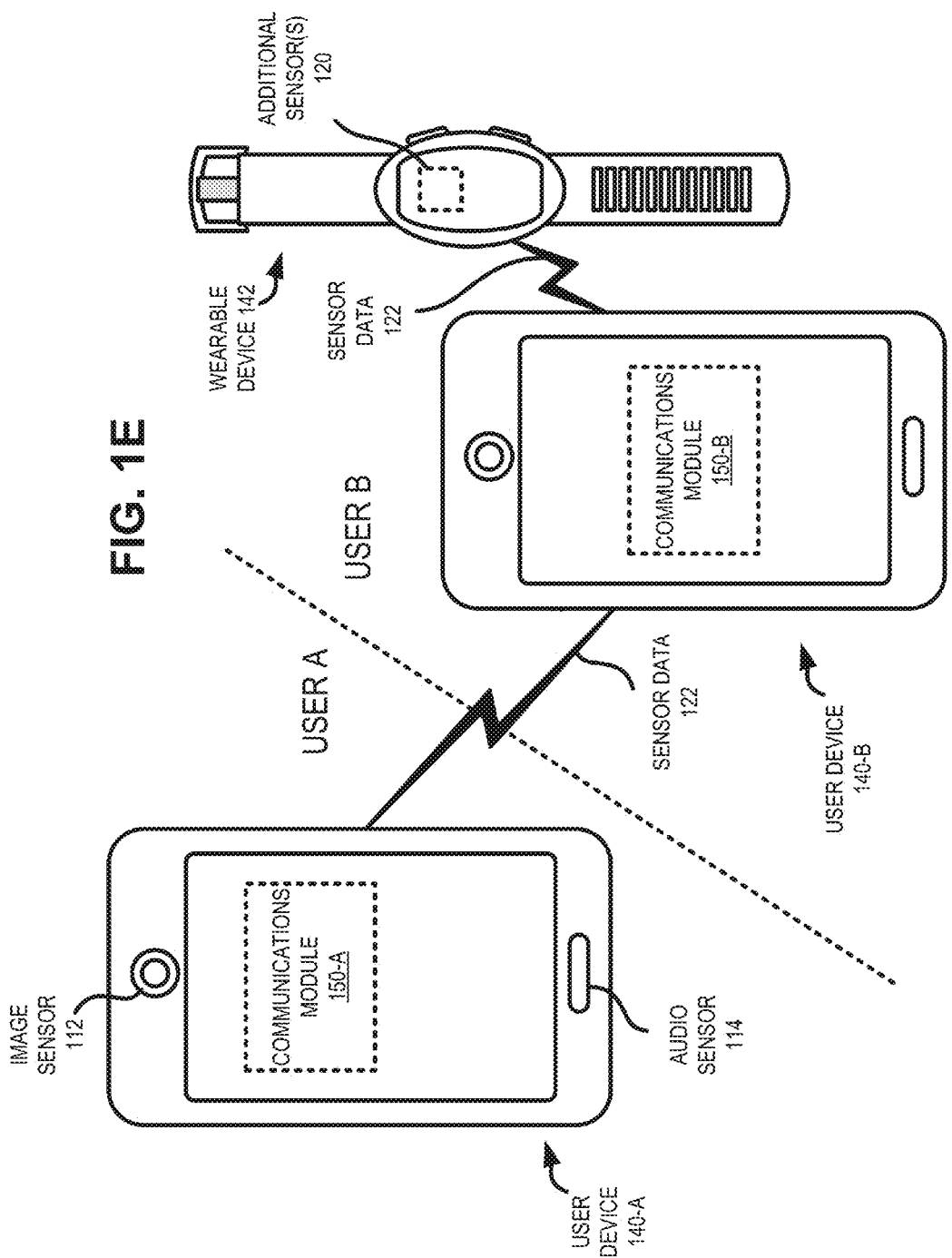

In another example, shown in FIG. 1E, user device 140-A (associated with User A) includes multimedia sensors 110 (such as image sensor 112-A and/or audio sensor 114-A) and may receive sensor data 122 collected by additional sensor(s) 120 included in wearable device 142 associated with another user (User B). For example, as described with respect to FIG. 1C, wearable device 142 may collect information regarding a movement and/or biometric information of User B. In the example shown in FIG. 1E, sensor data 122 may be received by another user device 140-B (associated with User B) and forwarded to user device 140-A. For example, as described above with respect to FIG. 1D, user devices 140-A and 140-B may include communications modules 150-A and 150-B to exchange of sensor data 122 via a physical connection or a wireless connection.

In one implementation, the other user device 140-B may include multimedia sensor(s) 110 (such as image sensor 112 and/or audio sensor 114) and/or other additional sensor(s) 120. User device 140-B may then forward, to user device 140-A, sensor data 122 that is collected by additional sensors 120 included in both wearable device 142 and user devices 140-B. For example, if both user device 140-B and wearable device 142 include motion sensors, sensor data 122 may include data identifying different motions detected by user device 140-B and wearable device 142 (e.g., motions associated with different body parts of User B).

In another example, communications module 150-B may also function as an additional sensor 120. For example, user device 140-B may attempt to communicate or otherwise detect another user device 140-A. For example, user device 140-B may attempt to detect a connection request (e.g., a Bluetooth® connect request) identifying user device 140-A associated with User A. If user device 140-B detects a short-range connection request identifying user device 140-A, user device 140-A may determine that user device 140-A (and the associated User A) is in close physical proximity.

Although FIGS. 1A-1E depict exemplary components that may be used in certain examples, fewer components, additional components, different components, or differently arranged components than those illustrated in FIGS. 1A-1E may be used. For example, a user may wear multiple different wearable devices 142, and the different wearable devices 142 may collect different sets of sensor data 122. In another example, user device 140-A (e.g., associated with User A) may collect sensor data 122 from user devices 140 and/or wearable devices 142 associated with multiple other users. Furthermore, components of user device 140 and/or wearable device 142 may perform functions described as being performed by other components of user device 140 and/or wearable device 142. For example, wearable device 142 may include image sensor 112, audio sensor 114, and/or a communications module 150 that are described above with respect to user device 140.

As shown in FIGS. 1F and 1G, sensor data 122 within augmented multimedia content 130 may be used to present additional information regarding a detected special event. For example, as shown in FIGS. 1F and 1G, a display device 170 may present a display 180 (shown in display 180-A in FIG. 1F and 180-B in FIG. 1G) based on augmented multimedia data 130. Display 180 may include a representation of subject 101 and a navigation element 182. Navigation element may 182 allow a viewer to select different portions of multimedia content captured by multimedia sensors 110. For example, navigation element may 182 may correspond to different time periods, and a viewer may provide an input to select a portion of navigation element may 182 to cause display 180-A to include multimedia content associated with a corresponding one of the time periods.

In one implementation shown in FIG. 1F, display 180-A may include one or more notable event elements 184 that identify portions of the multimedia content that correspond to detected notable events. For example, portions of sensor data 122 having a given value and/or a range of values associated with a notable event may be identified, and time periods associated with these portions of the sensor data 122 may be further identified. Notable event elements 184 may provide a graphical indication of the time period for the special event. Notable event elements 184 may be positioned adjacent to corresponding portions of navigation element 182. Additionally, notable event element 184 may include a particular shape, color, brightness, text, or other visual indication to differentiate notable event element 184 from other portions of navigation element may 182. Selection of notable event element 184 and/or a corresponding portion of navigation element 182 may cause display 180-A to present multimedia content captured during the time that the notable event was detected. Thus, display 180-A may provide a graphical mechanism to enable a viewer to easily identify and access multimedia content associated with a notable event (e.g., during the performance of a given action by subject 101 that is detected by additional sensors 130). For example, notable event element 184 may act as a tag or bookmark to identify portions of the multimedia content captured during the detected notable event.

In one implementation shown in FIG. 1G, display 180-B may further include information associated with a detected notable event. For example, notable event element 184 and/or another portion of display 180-B may provide a notable event identifier 186 for the detected notable event (shown in FIG. 1G as "Trick Detected"). Notable event identifier 186 may present a string of alphanumeric characters (e.g., a name for the notable event) and/or an image (i.e., a thumbnail from the associated portion of multimedia content) associated with a notable event. In another example, notable event identifier 186 may present information regarding why the time period was identified a notable event (e.g., an explanation that a detected velocity is greater than a threshold value associated with a trick or other notable event).

As further shown in FIG. 1G, display 180-B may also include a sensor data element 188. Sensor data element 188 may identify a portion of sensor data 122 that was collected at the time that corresponds to the multimedia content being presented in display 180-B. In the specific example shown in FIG. 1G, sensor data element 188 may identify a particular velocity (28 MPH) and a particular acceleration (1.3 G Forces) detected for subject 101 during the displayed portion of the multimedia content. In another example, sensor data element 188 may present other sensor data and/or multimedia data captured by another device.

In another example (not shown), display 180 may present only one or more portions of multimedia content associated detected notable event(s). For example, display 180 may present thumbnails or other graphical indications of the notable events (e.g., notable event identifier 186), and a user selection of one of these thumbnails may cause multimedia captured during the time period of the notable event to be presented for display.

Although FIGS. 1F and 1G depict exemplary graphical elements that may be presented in certain examples, fewer graphical elements, additional graphical elements, different graphical elements or differently arranged graphical elements than those illustrated in FIGS. 1F and 1G may be displayed. For example, display 180 may present sensor data (e.g., sensor data element 188) separately from multimedia content captured by multimedia sensor 110. In another example, display 180 may present multiple sensor data elements 188, such as different sensor data elements 188 presenting portions of sensor data 122 collected by different devices.

Figure 2:
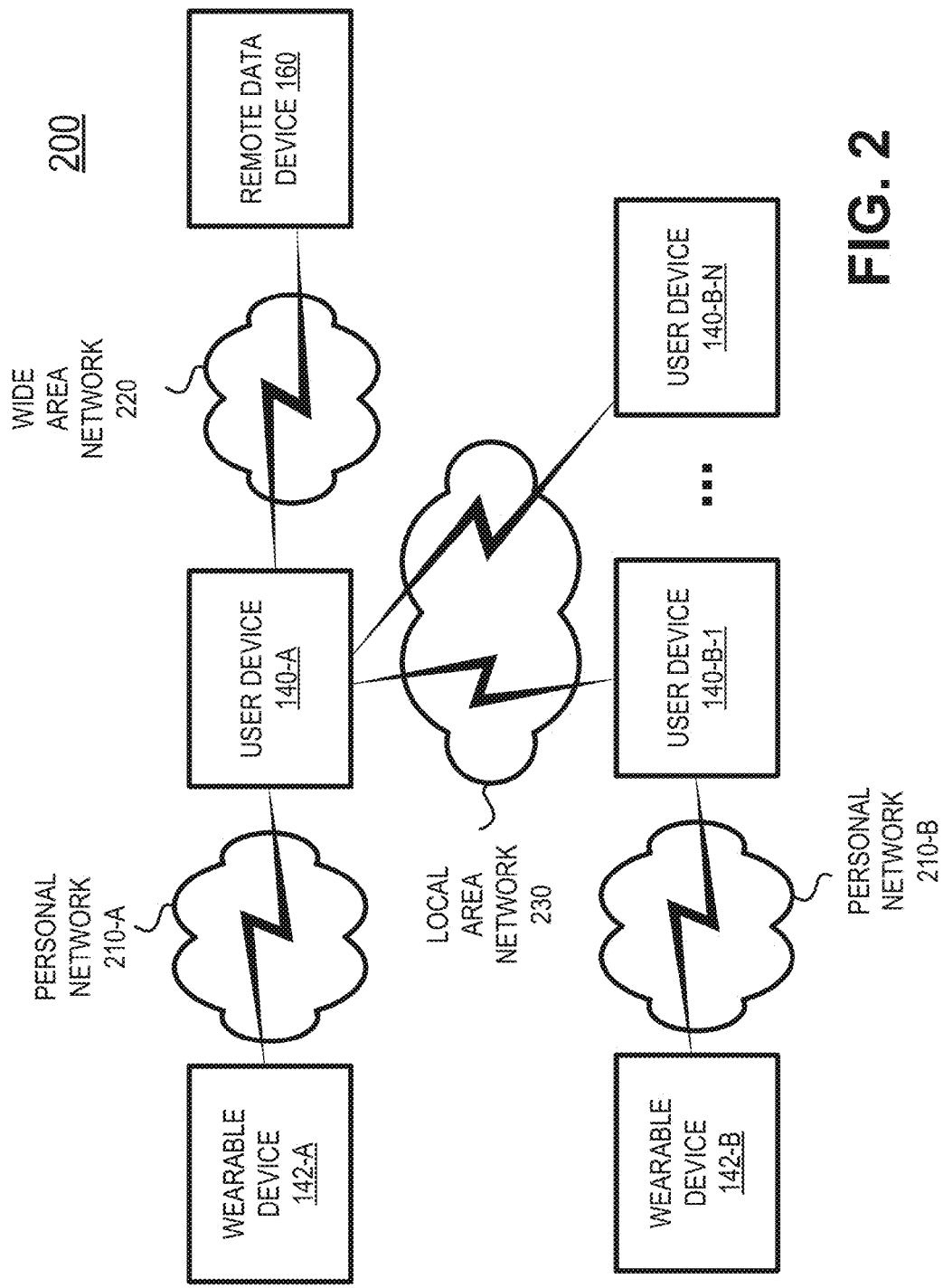
FIG. 2 is a diagram showing an exemplary environment in which the systems and methods described herein may be implemented.

FIG. 2 shows an exemplary environment 200 in which the systems and methods described herein may be implemented. As shown in FIG. 2, environment 200 may include wearable devices 142-A and 142-B, user devices 140-A and 140-B-1 (e.g., associated with wearable device 142-B) through 140-B-N, remote data device 160, personal area networks (PAN) or personal networks 210-A and 210-B (referred to collectively as personal networks 210 and individually as personal network 210), a wide area network 220, and/or a local area network 230.

Wearable devices 142-A and 142-B and mobile devices 140-A and 140-B may function as described above with respect to FIG. 1. For example, wearable devices 142-A and 142-B may detect movements by associated users, and user devices 140-A and 140-B may exchange contact information based on determining that the detected movements relate to a common social interaction.

A wearable device 142 and a user device 140 associated with a user may exchange data (e.g., sensor data 122) via an associated personal network 210. Personal network 210 may operate based on, for example, a Bluetooth® wireless interface, a RFID interface, a NFC wireless interface, IR communications interface, and/or any other type of interface to exchanges data between wearable device 142 and user device 140. Additionally or alternatively, wearable device 142 and user device 140 may be connected with via a physical connection such as a cable.

User device 140-A may communicate with remote data device 160 via network 220. Network 220 may include a communications network, a data network, or a combination of networks that connect user device 140-A and remote data device 160. For example, network 220 may include a local area network (LAN), a wide area network (WAN), a metropolitan area network (MAN), a wireless network, an optical fiber (or fiber optic) network, an internet, the Internet, or a combination of these or other networks. In addition or alternatively, network 220 may include or be included in a wireless network capable of supporting wireless communications to/from one or more devices in environment 200. The wireless network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 1000 (CDMA2000), High-Speed Packet Access (HSPA), Worldwide Interoperability for Microwave Access (WiMax), enhanced high-rate packet data (eHRPD), or a network implemented in accordance with other wireless network standards, including future wireless network standards.

Local area network 230 may connect user device 140-A and one or more other user devices 140-B-1 through 140-B-N located at a common geographic location, and user devices 140-A and 140-B-1 through 140-B-N may exchange sensor data 122 via local area network 230. For example, local area network 230 may be a wireless local area network (WLAN) based on the International Electrical and Electronics Engineers 802.11 protocol, or other short-range network through which user device 140-A and 140-B-1 through 140-B-N may communicate. For example, user devices 140-A and 140-B-1 through 140-B-N may communicate via Bluetooth®, Wi-Fi®, and/or another short-range wireless network protocol. In another example, user devices 140-A and 140-B-1 through 140-B-N may communicate via a near field communication ("NFC") or an infrared-based communications such as Infrared Data Association (IrDA) protocols.

Although FIG. 2 shows exemplary components of environment 200, in other implementations, environment 200 may include fewer components, different components, differently arranged components, or additional components than those depicted in FIG. 2. Additionally or alternatively, one or more components of environment 200 may perform functions described as being performed by one or more other components of environment 200.

FIG. 3 is a diagram illustrating exemplary functional components of a computing device 300 according to an implementation described herein. User device 140, wearable device 142, remote data device 160, display device 170, and/or an element of network 220/local area network 230 (e.g., a hot spot, a node, router, blade, etc.) may include one or more computing devices 300. As shown in FIG. 3, device 300 may include a bus 310, a processing unit 320, a memory 330, an input device 340, an output device 350, and a communication interface 360.

Bus 310 may include a path that permits communication among the components of device 300. Processing unit 320 may include any type of single-core processor, multi-core processor, microprocessor, latch-based processor, and/or processing logic (or families of processors, microprocessors, and/or processing logics) that interprets and executes instructions. In other embodiments, processing unit 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processing unit 320, and/or any type of non-volatile storage device that may store information for use by processing unit 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals.

Communication interface 360 may include and/or may be coupled to an antenna for transmitting and receiving RF signals. For example, communication interface 360 may be coupled to an antenna assembly that includes one or more antennas to transmit and/or receive RF signals. The antenna assembly may, for example, receive data from communication interface 360 and transmit RF signals associated with the data, or the antenna assembly may receive RF signals and provide them to communication interface 360 to be processed.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a Wi-Fi card) card for wireless communications. Communication interface 360 may also include a universal serial bus (USB) port for communications over a cable, a Bluetooth® wireless interface, a RFID interface, a NFC wireless interface, and/or any other type of interface that converts data from one form to another form.

As will be described in detail below, device 300 may perform certain operations, and device 300 may perform these operations in response to processing unit 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processing unit 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than those depicted in FIG. 3. Additionally or alternatively, one or more components of device 300 may perform one or more tasks described as being performed by one or more other components of device 300.

Figure 4B:
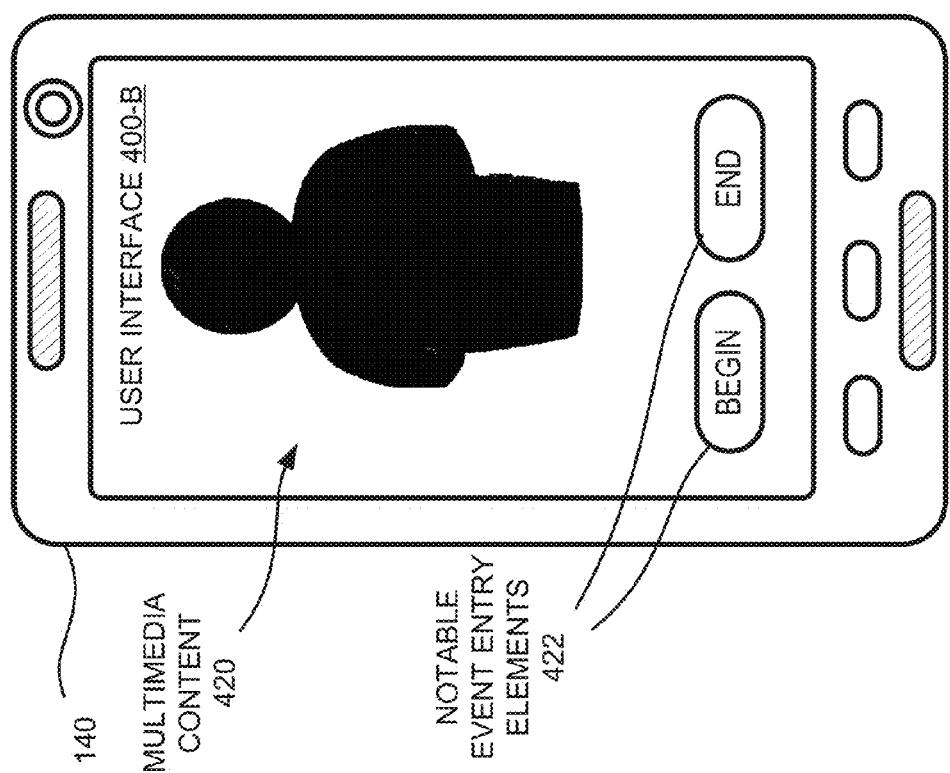

FIGS. 4A-4C show exemplary user interfaces 400-A through and 400-C (referred to collectively as user interface 400) that may be presented by user device 140 in certain implementations. In the example shown in FIG. 4A, user interface 400-A may include a sensor selection prompt 410 and sensor data identifiers 412. Sensor selection prompt 410 may direct a user to select from among different types of sensor data associated with sensor data identifiers 412 (shown in FIG. 4A as "Location Data", "Motion Data", and "Biometric Data") to identify notable events, such as via a user input on a touch screen display included in user device 140. Sensor data identifiers 412 may identify, for example, additional sensor(s) 120 included in user device 140 and/or a wearable device 142 coupled to user device 140.

In one example, user interface 400-A may be presented any time and set up by a user prior to the capture of sensor and/or multimedia data. In another example, User device 140 may present user interface 400-A when multimedia content is being captured by the user device 140, a wearable device 142 coupled to user device 140, and/or by another user device 140. For example, user device 140 may present user interface 400-A based on a receiving a notification from wearable device 142 or another user device 140 that multimedia data is being captured. As previously described, user device 140 may process the selected types of sensor data 122 (corresponding to sensor data types selected through user interface 400-A) to identify the occurrence of notable events captured in multimedia content.

FIG. 4B shows an exemplary user interface 400-B that may be used to identify sensor values (or ranges of values) associated with a notable event. For example, user device 140 may present, in user interface 400-B, multimedia content 420 and may receive a user input through notable event entry elements 422 (shown in FIG. 4B as a "Begin" element and an "End" element). For example, user interface 400-B may enable a user to specify, using event entry elements 422, a portion of multimedia content 420 depicting a notable event. User device 140 may then identify values (or ranges of values) associated with different sensor data (e.g., as selected in user interface 400-B) that are present during the selected portion(s) of multimedia content 420. For example, user device 140 may identify a time period when the selected portion of multimedia content 420 was captured, and user device 140 may identify sensor values (or ranges of values) captured during the time period. For example, a user may identify a particular speed (e.g., greater than 15 mph) or a particular movement as corresponding to a notable event.

In one implementation, user device 140 may compare sensor values (or ranges of values) associated with the time period of the notable event with sensor values (or ranges of values) captured during a different time period. User device 140 may identify one or more sensor values (or ranges of values) that differ by more than a threshold amount during the time period of the notable event. User device 140 (or another device) may then use these sensor values (or ranges of values) to identify, as a potential notable events, another portion of multimedia content 420 associated with similar sensor values (or ranges of values). Types of sensor data reviewed by user device 140 with respect to an identified event may be selected, for example, based on a user input received via user interface 400-A.

FIG. 4C shows an exemplary user interface 400-C that may present a verification request 430 on user device 140. For example, verification request 430 may direct a user to agree to share sensor data with another user device 140 associated with device identification data 432 (shown in FIG. 4C as a telephone number of "123-456-7890"). In other examples, identification data 432 may include, for example, a network address, a media access control (MAC) address, or other information associated with user device 140. As shown in FIG. 4C, user interface 400-C may include verification control elements 434 (shown in FIG. 4C as a "Yes" element and a "No" element) to receive a user input responsive to verification request 430. Based on receiving confirmation (e.g., a user selection of the "Yes" verification control element 434), user device 140 may present user interface 400-A to enable a user to select types of sensor data to be shared with the other user device 140 identified by device identification data 432. Thus, user interface 400-C may enable user device 140 to selectively share different types of sensor data with different user devices 140.

In one example, user device 140 may present user interface 400-C based on receiving a connection request (e.g., a Bluetooth® connect request) identifying another user device 140 or wearable device 142. In one example, the other user device may forward the connection request when capturing multimedia content. In generating user interface 400-C, user device 140 may extract data regarding another device from the connection request and form the identification data 432 based on the extracted data. In one implementation, user device 140 may form a connection based on the connection request (e.g., based on the network address, the MAC address, or other information associated with the device forwarding the connection request. In another example, user device 140 may communication (e.g., based on contents of the connection request) the other user device 140 to obtain additional information regarding an associated user (e.g., a name, address, image, etc. associated with the user).

In other implementations, user interface 400-C may include additional information regarding the other user device 140, such as a geographic location where the other user device 140 is capturing multimedia content, a time when the other user device 140 is capturing multimedia content, environment conditions such as weather, light, sound conditions, names of users associated with other mobile devices at the geographic location, etc.

Although FIGS. 4A-4C exemplary types of data presented by user interface 400, in other implementations, user interface 400 may include fewer data types, different data types, additional data types, or differently arranged data types than those depicted in FIGS. 4A-4C. Additionally or alternatively, one or more portions of user interface may present data described as being presented by another portion of user interface 400.

FIG. 5 shows an exemplary process 500 for detecting a notable event and marking multimedia content to reflect the notable event. In some implementations, process 500 may be performed by user device 140. In other implementations, some or all of process 500 may be performed by another device or a group of devices separate from and/or including user device 140, such as wearable device 142 or another user device 140.

As shown in FIG. 5, process 500 may include identifying sensor values (or ranges of values) associated with a notable event (block 510). For example, as described above with respect to FIG. 4B, interface 400-B may enable a user to select a portion of multimedia content presenting a notable event, and user device 140 may identify a sensor value (or range of values) detected during the notable event. The sensor value(s) may relate to a subject 101 captured in the multimedia content. The sensor value may relate, for instance, to a movement, rotation, position, etc., of subject 101. For example, if subject 101 is skiing, a rotational acceleration of subject 101 above a threshold value may indicate that subject 101 is performing a trick, such as a flip. In another example, if subject 101 is a policeman and the notable event relates to a pursuit, the associated sensor values may relate to a velocity that exceeds a threshold value (e.g., a running speed). The sensor value may also relate to biometric data, such as a heart rate, a body temperature, a respiration rate, a blood oxygen levels, etc. Continuing with the example of a policeman, sensor data may indicate that the policeman is running and, therefore, in a pursuit when the policeman's heart rate exceeds a threshold value.

In another situation, sensor value(s) may relate to person capturing the multimedia content and/or a third-party viewer. For example, body temperature above a threshold value may indicate nervousness associated with watching subject 101 performing a stunt or trick. In yet another situation, sensor value(s) may relate to ambient conditions, such as temperature, moisture, ambient light, and/or ambient sound levels present when notable event occurred. In the example of subject 101 performing a trick or stunt, conversation levels and/or applause above a threshold volume may indicate successful completion of the stunt or trick.

In one implementation, identifying sensor values (or ranges of values) in block 510 may include identifying types of sensor data available when additional multimedia content is captured, and then identifying values (or ranges of values) for the identified types of sensor data during the notable event. For example, a user device 140 capturing multimedia content may identify additional sensors 120 included in the user device 140 and/or included in another user device 140 or wearable device coupled to the user device 140. User device 140 may then determine values associated with the identified additional sensors during a prior occurrence of the notable event.

As shown in FIG. 5, process 500 may also include collecting sensor data during the capture of multimedia content (block 520), and determining whether a portion of the sensor data corresponds to the values (or range of values) for a notable event (block 530). For example, user device 140 may use one or more additional sensors 120 to capture sensor data 122 while collecting multimedia content, as described above with respect to FIGS. 1B and 1C. In another example, user device 140 may interface with another user device 140 to exchange sensor data 122 collected by the other user device 140 and/or an associated wearable device 142, as described above with respect to FIGS. 1D and 1E. In block 530, user device 140 may determine whether any the collected sensor data corresponds to values and/or ranges of values observed during prior notable events (as identified in block 510).

In one example, sensor data captured during a time period may be used to identify a notable event that occurred during a prior time period. In this example, identifying the notable event may be treated as a hidden Markov model in which the sensor data identifies conditions associated with a hidden state (e.g., a notable event) and various statistical techniques may be employed to predict a likelihood that the notable event occurred. For example, the Viterbi algorithm may be used to recursively determine whether the sensor data is associated with a prior notable event. For example, if the sensor data relates to biometric data of a viewer, identifying the notable event related to a trick may include determining that the viewer shows signs of excitement (e.g., increased heart rate, blood pressure, and/or respiration) in absence of other factors (e.g., the viewer is not moving) that may have caused the biometric sensor data when the trick was not being performed.

In another example, user device 140 may identify a trend in the sensor data during a time period and use various statistical techniques to predict whether a notable event is likely to occur in a future time period. For example, if a notable event relates to performing a trick (or stunt), a Markov chain may be used to determine whether sensor data associated with subject 101 (e.g., velocity, acceleration, etc.) indicates whether subject 101 is likely to be performing the trick during a future time period. For example, if subject 101 is accelerating from a relatively slow velocity during a time period, user device 140 may determine a likelihood that subject 101 will reach a relatively faster velocity, associated with a notable event, during a subsequent time period, even though that velocity has not yet been detected.

If no portion of the sensor data corresponds to the values (or range of values) for a notable event (block 530-No), process 500 may end. Otherwise, if a portion of the sensor data corresponds to the values (or range of values) for a notable event (block 530-yes), user device 140 may identify multimedia content associated with the portion of the sensor data (block 540). User device 140 may determine a time signature indicating a time period when the portion of the sensor data is collected, and user device 140 may identify multimedia content captured during the time period.

User device 140 may then associate the multimedia content, identified in block 540, with the notable event (block 550). For example, as described above with respect to FIG. 1F, user device 140, when presenting multimedia content, may provide a graphical indication identifying portions of the presented multimedia captured during a detected notable event. In another example described with respect to FIG. 1G, user device 140 may augment the multimedia content to identify the notable event and/or to present sensor data collected during the notable event. For example, sensor data associated with a value (or range of values) may be presented in connection with a corresponding portion of the multimedia content (e.g., as sensor data element 188), and sensor data may not be presented during other portions of the multimedia content.

In another implementation, user device 140 may determine a likelihood that a notable event is occurring at a given time. For example, user device 140 may evaluate sensor values during prior occurrences of notable events, and user device 140 may determine how currently detected sensor values compare to sensor values detected during the prior occurrences of the notable events. For example, if the notable event relates to perform a particular type of stunt or trick, the sensor values may indicate that certain ranges of velocities and/or ranges of angular accelerations are present during the stunt or trick. User device 140 may then present information identifying the likelihood (e.g., a numerical value) that a portion of multimedia content is associated with a notable event.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described with respect to process 500 of FIG. 5, the order of the blocks in process 500 may be modified in other implementations. Further, non-dependent blocks and/or signals in process 500 may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   identifying, by a processor, a sensor value associated with an event;
   collecting, by the processor, sensor data associated with capturing multimedia content;
   determining, by the processor, a portion of the sensor data corresponding to the sensor value associated with the event;
   identifying, by the processor, a portion of the multimedia content associated with the portion of the sensor data;
   associating, by the processor, the portion of the multimedia content with an occurrence of the event, wherein associating the portion of the multimedia content with the occurrence of the event comprises:
      providing a graphical indication of the portion of the multimedia content, wherein the graphical indication is not presented for another portion of the multimedia content; and
   presenting, by the processor, the portion of the multimedia content for display, in response to a selection of the graphical indication.

2. The method of claim 1, wherein the sensor data is first sensor data, and wherein identifying the sensor value associated with the event includes:
   collecting second sensor data during a prior occurrence of the event; and
   identifying the sensor value based on the second sensor data.

3. The method of claim 2, wherein the multimedia content is first multimedia content, wherein the second sensor data is associated with capturing second multimedia content, and wherein the identifying the sensor value based on the second sensor data includes:
   presenting the second multimedia content for display;
   receiving an input identifying a portion of second multimedia content associated with the prior occurrence of the event; and
   identifying a portion of the second sensor data associated with the portion of the second multimedia content.

4. The method of claim 1, wherein collecting the sensor data includes:
   identifying a time period associated with capturing the multimedia content;
   connecting to a wearable device; and
   acquiring, as the sensor data, information collected by the wearable device during the time period.

5. The method of claim 1, wherein the processor is associated with a first user device; and wherein collecting the sensor data includes:
   identifying a time period associated with capturing the multimedia content;
   connecting to a second user device; and
   acquiring, as the sensor data, information collected by the second user device during the time period.

6. The method of claim 1, wherein associating the portion of the multimedia content with the occurrence of the event includes:
   presenting the portion of the sensor data when presenting the portion of the multimedia content.

7. The method of claim 1, wherein the sensor value corresponds to a threshold value, and wherein determining the portion of the sensor data corresponding to the sensor value associated with the event comprises:
   determining that sensor data associated with the identified portion of the multimedia content meets or exceeds the threshold value.

8. A device comprising:
   a memory configured to store instructions; and
   a processor configured to execute one or more of the instructions to:
      identify a sensor value associated with an event;
      collect sensor data associated with capturing multimedia content;
      determine a portion of the sensor data corresponding to the sensor value associated with the event;
      identify a portion of the multimedia content associated with the portion of the sensor data;
      associate the portion of the multimedia content with an occurrence of the event, wherein when associating the portion of the multimedia content with the occurrence of the event, the processor is further configured to:
         provide a graphical indication of the portion of the multimedia content, wherein the graphical indication is not presented for another portion of the multimedia content; and
      output the portion of the multimedia content for display, in response to a selection of the graphical indication.

9. The device of claim 8, wherein the sensor data is first sensor data, and wherein the processor, when identifying the sensor value associated with the event, is further configured to:
- collect second sensor data during a prior occurrence of the event; and
- identify the sensor value based on the second sensor data.

10. The device of claim 9, wherein the multimedia content is first multimedia content, wherein the second sensor data is associated with capturing second multimedia content, and wherein the processor, when identifying the sensor value based on the second sensor data, is further configured to:
- present the second multimedia content for display;
- receive an input identifying a portion of second multimedia content associated with the prior occurrence of the event; and
- identify a portion of the second sensor data associated with the portion of the second multimedia content.

11. The device of claim 8, wherein the processor, when collecting the sensor data, is further configured to:
- identify a time period associated with capturing the multimedia content;
- connect to a wearable device; and
- acquire, as the sensor data, information collected by the wearable device during the time period.

12. The device of claim 8, wherein the device is associated with a first user, and wherein collecting the sensor data includes:
- identifying a time period associated with capturing the multimedia content;
- connecting to another device associated with a second user; and
- acquiring, as the sensor data, information collected by the other device during the time period.

13. The device of claim 8, wherein the processor, when associating the portion of the multimedia content with the occurrence of the event, is further configured:
- present the portion of the sensor data when presenting the portion of the multimedia content.

14. The device of claim 8, wherein the sensor value corresponds to a threshold value, and when determining the portion of the sensor data corresponding to the sensor value associated with the event, the processor is configured to:
- determine that sensor data associated with the identified portion of the multimedia content meets or exceeds the threshold value.

15. A non-transitory computer-readable medium to store instructions, wherein the instructions comprise:
- one or more instructions that, when executed by a processor associated with a device, cause the processor to:
  - store a sensor value associated with an event;
  - collect sensor data associated with capturing multimedia content;
  - determine a portion of the sensor data corresponding to the sensor value associated with the event;
  - identify a portion of the multimedia content associated with the portion of the sensor data;
  - associate the portion of the multimedia content with an occurrence of the event, wherein when associating the portion of the multimedia content with the occurrence of the event, the instructions cause the processor to:
    - provide a graphical indication of the portion of the multimedia content, wherein the graphical indication is not presented for another portion of the multimedia content; and
  - output the portion of the multimedia content for display, in response to a selection of the graphical indication.

16. The non-transitory computer-readable medium of claim 15, wherein the sensor data is first sensor data, and wherein the one or more instructions further cause the processor, when storing the sensor value associated with the event, to:
- collect second sensor data during a prior occurrence of the event; and
- identify the sensor value based on the second sensor data.

17. The non-transitory computer-readable medium of claim 16, wherein the sensor data is first sensor data, wherein the multimedia content is first multimedia content, wherein the second sensor data is associated with capturing second multimedia content, and wherein the one or more instructions further cause the processor, when identifying the sensor value based on the second sensor data, to:
- present the second multimedia content for display;
- receive an input identifying a portion of second multimedia content associated with the prior occurrence of the event; and
- identify a portion of the second sensor data associated with the portion of the second multimedia content.

18. The non-transitory computer-readable medium of claim 15, wherein the one or more instructions further cause the processor, when collecting the sensor data, to:
- identify a time period associated with capturing the multimedia content;
- connect to another device; and
- acquire, as the sensor data, information collected by the other device during the time period.

19. The non-transitory computer-readable medium of claim 15, wherein the one or more instructions further cause the processor, when associating the portion of the multimedia content with the occurrence of the event, to:
- present the portion of the sensor data when presenting the portion of the multimedia content.

20. The non-transitory computer-readable medium of claim 15, wherein the sensor value corresponds to a threshold value, and when determining the portion of the sensor data corresponding to the sensor value associated with the event, the one or more instructions, when executed by the processor, further cause the processor to:
- determine that sensor data associated with the identified portion of the multimedia content meets or exceeds the threshold value.

* * * * *